US007922808B2

(12) United States Patent
Brower et al.

(10) Patent No.: US 7,922,808 B2
(45) Date of Patent: Apr. 12, 2011

(54) FREEZE-THAW DURABILITY OF DRY CAST CEMENTITIOUS MIXTURES

(75) Inventors: Lynn E. Brower, Solon, OH (US); Thomas M. Vickers, Jr., Concord Township, OH (US); Patrick Miller, North Lawrence, OH (US); Bruce J. Christensen, Shanghai (CN)

(73) Assignee: Construction Research & Technology GmbH, Trostberg (DE)

( * ) Notice: Subject to any disclaimer, the term of this patent is extended or adjusted under 35 U.S.C. 154(b) by 1408 days.

(21) Appl. No.: 11/152,957

(22) Filed: Jun. 14, 2005

(65) Prior Publication Data
US 2005/0274294 A1 Dec. 15, 2005

Related U.S. Application Data

(60) Provisional application No. 60/579,833, filed on Jun. 15, 2004, provisional application No. 60/579,900, filed on Jun. 15, 2004.

(51) Int. Cl.
*C04B 7/00* (2006.01)
*C04B 24/00* (2006.01)

(52) U.S. Cl. ........................................ 106/713; 106/802

(58) Field of Classification Search .................. 106/713, 106/802
See application file for complete search history.

(56) References Cited

U.S. PATENT DOCUMENTS

| 2,797,201 | A | | 6/1957 | Veatch et al. |
| 3,272,765 | A | | 9/1966 | Sefton |
| 3,361,688 | A | | 1/1968 | Bonitz et al. |
| 3,591,394 | A | | 7/1971 | Diggelmann et al. |
| 3,804,058 | A | | 4/1974 | Messenger |
| 3,902,911 | A | | 9/1975 | Messenger |
| 4,057,526 | A | | 11/1977 | de Rook |
| 4,082,562 | A | | 4/1978 | Litvan et al. |
| 4,142,909 | A | * | 3/1979 | Gaines .......................... 106/673 |
| 4,204,875 | A | * | 5/1980 | Szalavitz ....................... 106/643 |
| 4,234,344 | A | | 11/1980 | Tinsley et al. |
| 4,252,193 | A | | 2/1981 | Powers et al. |
| 4,303,736 | A | * | 12/1981 | Torobin ......................... 428/403 |
| 4,340,427 | A | * | 7/1982 | Sutton ........................... 106/641 |
| 4,340,510 | A | | 7/1982 | Howanietz et al. |

(Continued)

FOREIGN PATENT DOCUMENTS

AU 404612 5/1967

(Continued)

OTHER PUBLICATIONS

Betonwerk+Fertigteil-Technik—"A New Method of Making Concrete Resistant to Frost and De-icing Salts" by Dr. Sommer; Sep. 1978.

(Continued)

*Primary Examiner* — Jerry Lorengo
*Assistant Examiner* — Shuangyi Abu Ali
(74) *Attorney, Agent, or Firm* — Curatolo Sidoti Co., LPA; Joseph G. Curatolo; Salvatore A. Sidoti

(57) ABSTRACT

An improved freeze-thaw durability dry cast cementitious composition is provided that uses very small (0.1 μm to 100 μm average diameter) polymeric microspheres that are blended directly into the mixture and optionally gas-generating additives. The polymeric microspheres provide void spaces in the material matrix that act to increase freeze-thaw durability of the material. In this dry cast cementitious composition, polymeric microspheres act as pre-formed voids.

20 Claims, 2 Drawing Sheets

U.S. PATENT DOCUMENTS

| | | | |
|---|---|---|---|
| 4,367,093 | A | 1/1983 | Burkhalter et al. |
| 4,427,836 | A | 1/1984 | Kowalski et al. |
| 4,450,010 | A | 5/1984 | Burkhalter et al. |
| 4,468,498 | A | 8/1984 | Kowalski et al. |
| 4,594,363 | A | 6/1986 | Blankenship et al. |
| 4,654,084 | A | 3/1987 | Heinen |
| 5,188,889 | A | 2/1993 | Nagatomi et al. |
| 5,571,318 | A | 11/1996 | Griffith et al. |
| 5,728,209 | A | 3/1998 | Bury et al. |
| 6,060,535 | A | 5/2000 | Villar et al. |
| 6,485,560 | B1 | 11/2002 | Scherer et al. |
| 6,508,305 | B1 | 1/2003 | Brannon et al. |
| 6,572,697 | B2 | 6/2003 | Gleeson et al. |
| 6,617,364 | B2 | 9/2003 | Soane et al. |
| 6,626,991 | B1 | 9/2003 | Drochon et al. |
| 6,722,434 | B2 | 4/2004 | Reddy et al. |
| 2001/0044477 | A1* | 11/2001 | Soane et al. .................... 521/60 |
| 2002/0117086 | A1 | 8/2002 | Shi et al. |
| 2003/0110984 | A1 | 6/2003 | Scherer et al. |
| 2003/0116064 | A1 | 6/2003 | Danican et al. |
| 2003/0205172 | A1 | 11/2003 | Gleeson et al. |
| 2003/0221831 | A1 | 12/2003 | Reddy et al. |
| 2004/0045713 | A1* | 3/2004 | Bianchi et al. ................ 106/673 |
| 2004/0147406 | A1* | 7/2004 | Go Boncan .................... 507/200 |
| 2004/0168801 | A1 | 9/2004 | Reddy et al. |
| 2004/0221990 | A1 | 11/2004 | Heathman et al. |
| 2005/0098317 | A1 | 5/2005 | Reddy et al. |
| 2005/0274285 | A1 | 12/2005 | Christensen et al. |
| 2005/0274294 | A1 | 12/2005 | Brower et al. |
| 2005/0284340 | A1 | 12/2005 | Vickers et al. |
| 2006/0281835 | A1 | 12/2006 | Ong |
| 2006/0281836 | A1 | 12/2006 | Kerns et al. |

FOREIGN PATENT DOCUMENTS

| | | |
|---|---|---|
| DE | 19 61 390 A1 | 6/1971 |
| DE | 2 229 094 | 1/1973 |
| DE | 2229094 | 1/1973 |
| DE | 30 26 719 A1 | 5/1981 |
| DE | 3026719 A1 | 5/1981 |
| EP | 0 022 633 B1 | 1/1981 |
| EP | 0 073 529 B1 | 3/1981 |
| EP | 0 118 325 B1 | 7/1986 |
| JP | 07-206505 A | 8/1995 |

OTHER PUBLICATIONS

Patent Abstracts of Japan, vol. 1996, No. 02, Feb. 29, 1996 & JP 07 277794 A (Kanegafuchi Chem Inc. Co. Ltd. Oct. 24, 1995.

Patent Abstracts of Japan, vol. 1999, No. 11, Sep. 30, 1999 & JP 11 147777 A (Kanegafuchi Chem Ind Do. Ltd., Jun. 2, 1999.

Patent Abstracts of Japan, vol. 1999, No. 14, Dec. 22, 1999 & JP 11 246253 A (Taisei Corp) Sep. 14, 1999.

Patent Abstracts of Japan, vol. 1996, No. 07, Jul. 31, 1996 & JP 08 059327 A (Hokkaido Kaihatsukyoku Doboku Kenkyusho Shin Etsu Chem Co. Ltd.

Internet Article, "PM 6550 Hollow Spheres" (www.sphereone.net/extendospheres/PM%206550%20PDS.pdf).

Internet Brochure, Apr. 25, 2005, "EXPANCEL microspheres expand—and so does your profitability" (www.expancel.com/All_languages/about/files/EXPGEN002EN_Expancel%C2%AEMagic.pdf).

Patent Abstracts of Japan, vol. 2003, No. 02, Feb. 5, 2003 & JP 2002 294656 A (Life Stage Kigyo Kumiai, Oct. 9, 2002).

Patent Abstracts of Japan, vol. 1996, No. 09, Sep. 30, 1996 & JP 08 133799 A (Asahi Chem Ind Co Ltd; Toyo Sogo Kenkyusho:KK, May 28, 1996).

* cited by examiner

FREEZE-THAW DURABILITY OF DRY CAST CEMENTITIOUS MIXTURES

CROSS REFERENCE TO RELATED APPLICATIONS

This application claims the benefit of the filing date of U.S. Provisional Application for Patent Ser. No. 60/579,833 filed Jun. 15, 2004 and U.S. Provisional Application for Patent Ser. No. 60/579,900 filed Jun. 15, 2004.

BACKGROUND

It is well known that freezing and thawing cycles can be extremely damaging to hardened cement compositions, such as concrete and that the best known technique to prevent or reduce the damage done is the incorporation in the composition of microscopically fine pores or voids. The pores or voids function as stress relievers and can therefore protect the concrete from frost damage. The method used in the prior art for artificially producing such voids in concrete has been by means of air-entraining agents, which stabilize tiny bubbles of air that are entrained in the concrete.

Air-entrained concrete is one of the most difficult types of concrete to make, as the content of air entrained in the concrete cannot be controlled by direct quantitative means, but only indirectly through the amount/type of air-entraining agent added to the mixture. Air content is also influenced by factors such as the composition and particle shape of the aggregates, the type and quantity of cement in the mix, the consistency of the concrete, the type of mixer used, the mixing time, and the temperature.

Those skilled in the art have learned to control these influences by the application of appropriate rules for making air-entraining concrete. They do, however, require the exercise of particular care in making such concrete and continually checking the air content, because if it is too low, the frost resistance of the concrete will be inadequate, while, on the other hand, if it is too high, it will adversely affect the strength.

However, additional difficulties arise in connection with cementitious compositions of stiff consistency such as that for making dry cast mixtures and articles. In this case, the air content cannot be tested in the fresh cementitious compositions, but only in the hardened cementitious compositions, which is too late for controlling the air content during mixing.

Cementitious dry cast mixtures are used to form many articles, for example, concrete pipe, roof tile, masonry units, paver units, extruded plank, and any other preformed cementitious articles, in a mold or from an extrusion die. Each of these applications has basic desired characteristics that are critical in terms of producing quality finished units.

Therefore, it is desirable to provide an admixture that produces a freeze-thaw durable void structure directly in a dry cast mixture without requiring the stabilization of air bubbles during mixing. The void structures may comprise optimally sized voids, which when incorporated into the dry cast mixture, will provide the cementitious composition with improved freeze-thaw durability. The admixture should also reduce or eliminate the loss of compressive strength for products manufactured from dry cast mixtures containing air-entraining chemical admixtures.

Using polymeric microspheres, it should be possible to make cementitious compositions with a substantially lower and less variable voids content and, therefore, with higher and more uniform strength than can be accomplished with an air-entraining agent.

SUMMARY

A cementitious freeze-thaw damage resistant dry cast composition is provided which comprises hydraulic cement, polymeric microspheres, and optionally gas generating additives A method for preparing a freeze-thaw damage resistant dry cast cementitious article is provided which comprises mixing hydraulic cement, polymeric microspheres and optionally a gas generating additive to produce a cementitious composition mixture; and forming the mixture into an article.

DETAILED DESCRIPTION

Figure 1:
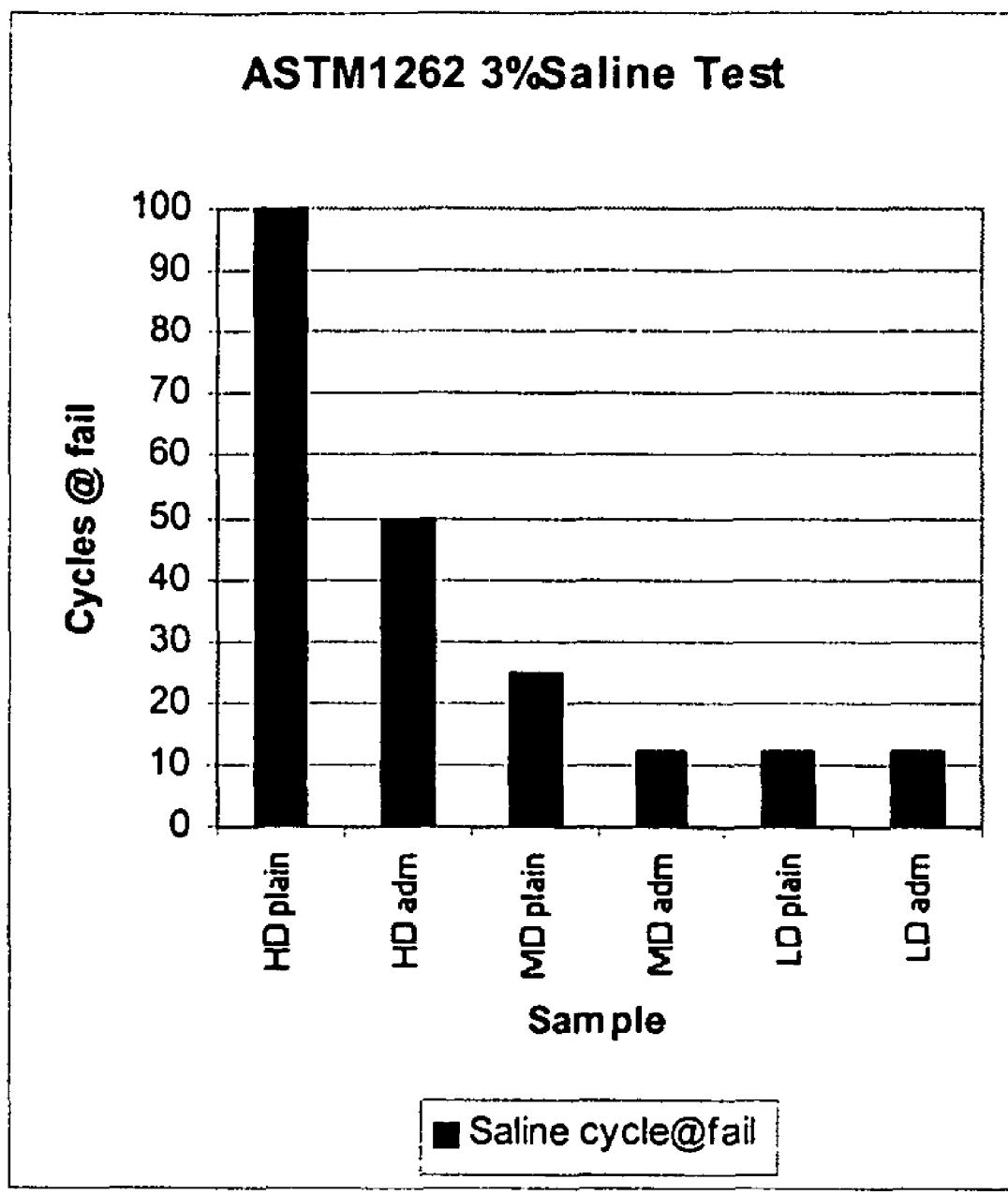
FIG. 1 is a graph demonstrating at which number of cycles the different density dry cast cementitious mixtures, i.e. those with an admixture and those without, fail.

An improved freeze-thaw durability dry cast cementitious composition is provided that uses very small (0.1 µm to 100 µm) liquid filled (unexpanded) or gas-filled (expanded) polymeric microspheres that are blended directly into the mixture. Expanded polymeric microspheres (formed by expansion of a self contained liquid to gas phase) or unexpanded polymeric microspheres (contain unexpanded liquid state) may be used. Such particles are produced and marketed under a variety of trade names and use a variety of materials to form the wall of the particle. One generic term of reference for these particles is polymeric microspheres. Dry cast cementitious mixtures are any mixture of cementitious binder, such as pastes, mortars, and concrete compositions characterized generally by a very low (<1 inch) to zero value of slump (ASTM C-143) and consistencies ranging from stiff to extremely dry, as defined in ACI 211.3R, Table 2.3.1. Dry cast mixtures are also known as low-slump, no-slump or zero-slump mixtures.

All the factors which tend to make the successful production of air-entrained cementitious compositions so difficult would be removed if it were possible to incorporate the air as tiny hollow particles. The air content of the cementitious compositions would then depend only on the actual amount of particles added, and supervision could be confined to keeping a check on the quantities of admixture consumed. The chemical industry now manufactures polymeric microspheres which can be incorporated, instead of an air-entraining agent, into cementitious mixtures.

The polymeric microspheres can be produced with diameters that vary within a fairly narrow range, e.g. between 0.1 µm. and 100 µm. The interior portion of the polymeric microspheres comprises a void cavity or cavities that may contain gas (gas filled) as in expanded polymeric microspheres or liquid (liquid filled) such as in unexpanded polymeric microspheres. The smaller diameter polymeric microspheres with an average diameter of 10 µm or less are used in one embodiment, as less are required to achieve the desired spacing factor and subsequent resistance to freezing and thawing. In comparison, the diameters of the voids in ordinary air-entrained cementitious compositions show a very wide range of variation, between 10 µm. and 3,000 µm. or more. In such cementitious compositions, the presence of larger voids—which merely reduce the strength of the cementitious compositions—has to be accepted as an unavoidable feature.

The dry cast cementitious composition uses the polymeric microspheres to provide void spaces in the material matrix, and such void spaces act to increase the freeze-thaw durability of the material. The freeze-thaw durability enhancement produced by polymeric microspheres relies on a well-documented physical mechanism for relieving stresses produced when water freezes in a cementitious material. In conventional practice, properly sized and spaced voids are generated in the hardened material by using chemical admixtures to stabilize the air entrained to a cementitious composition during mixing. In conventional cementitious compositions these chemical admixtures as a class are called air entraining agents. In this new process, polymeric microspheres act as pre-formed voids and do not require the chemicals traditionally used to stabilize air bubbles that leave void spaces in hardened cementitious mixtures.

The addition of polymeric microspheres to a dry cast cementitious composition increases the resistance of products manufactured from dry cast cementitious compositions to the degradation produced by repeated cycles of freezing and thawing temperatures. These products include, but are not limited to, concrete block, pavers, segmented retaining wall (SRW) units and roof tiles. Such products can be susceptible to structural degradation when subjected to repeated changes in temperature below and above the freezing point of water. This degradation is accelerated if the product is in contact with water and even further accelerated if the product is in contact with water containing salts.

In one embodiment, the dry cast cementitious composition or the process for making the same may use in-situ gas generation in combination with polymeric microspheres to provide void spaces in the dry cast cementitious material matrix prior to final setting, and such void spaces act to increase the freeze-thaw durability of the dry cast cementitious material. In-situ gas generation introduces gas bubbles to produce a fully formed void structure in the dry cast cementitious composition that resists the degradation produced by freeze-thaw cycles and does not rely on air incorporation by entrainment during mixing. The freeze-thaw durability enhancement produced by in-situ gas generation is based on a physical mechanism for relieving stresses produced when water freezes in a dry cast cementitious material. In conventional practice, properly sized and spaced voids are generated in the hardened material by using chemical admixtures to stabilize the air entrained to a dry cast cementitious composition during mixing. In conventional cementitious compositions these chemical admixtures as a class are called air entraining agents. In this new process, gas generated in the dry cast cementitious mixture produces bubbles that introduce void spaces in the hardened material.

In this process of increasing freeze-thaw durability in dry-cast cementitious compositions, polymeric microspheres in combination with the void spaces produced by the in-situ gas generation act as pre-formed voids and do not require the chemicals traditionally used to produce and stabilize air bubbles that leave void spaces in hardened cementitious mixtures.

Previous work has demonstrated that development of properly spaced air void structures in the cementitious composition matrix can improve durability of products in conditions that produce freeze-thaw degradation. However, that same work also indicated that chemical admixtures which stabilize air bubbles in regular wet cast cementitious compositions do not work reliably in dry cast mixtures. The present embodiment uses an alternate approach of introducing proper air void structure in the dry cast cementitious composition matrix by introducing polymeric microspheres, and, optionally, in-situ gas generation, and does not require the stabilization of entrained air bubbles in the fresh cementitious mixture. The problem that had continued to plague the dry cast cementitious composition products industry was the inconsistent performance of products using existing freeze-thaw durability enhancing admixture treatments. Existing admixtures rely on stabilization and retention of air bubbles entrained in the fresh mixture during mixing.

The addition of polymeric microspheres and, optionally, gas generating additives to a dry cast cementitious composition increases the durability of products manufactured from dry cast cementitious compositions to repeated cycles of freezing and thawing temperatures.

Cementitious dry cast mixtures are used to form many articles, for example, concrete pipe, roof tile, masonry units, paver units, extruded plank, and any other preformed cementitious articles, in a mold or from an extrusion die. Each of these applications has basic desired characteristics that are considered when producing quality finished units The cementitious dry cast mixtures provided generally comprise hydraulic cement, polymeric microspheres, aggregate, and optionally gas-generating additives and pozzolans such as fly ash or calcined clay, pigments, and dispersant. Water is added to produce a castable, hydratable mixture.

The hydraulic cement can be a portland cement, a magnesium phosphate cement, a magnesium potassium phosphate cement, a calcium aluminate cement, a calcium sulfoaluminate cement or any other suitable hydraulic binder. The aggregate can be silica, quartz, sand, crushed round marble, glass spheres, granite, limestone, calcite, feldspar, alluvial sands, any other durable aggregate, and mixtures thereof.

The polymeric microspheres may be comprised of a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, or copolymers or mixtures thereof, such as copolymers of vinylidene chloride-acrylonitrile, polyacrylonitrile-copolymethacrylonitrile, polyvinylidene chloride-polyacrylonitrile, or vinyl chloride-vinylidene chloride, and the like. As the polymeric microspheres are composed of polymers, the wall is flexible, such that it moves in response to pressure. This is in comparison to glass, ceramic or other inflexible materials which produce polymeric microspheres with rigid structures that fracture when exposed to pressure. The material from which the polymeric microspheres are to be made, therefore, is flexible, yet resistant to the alkaline environment of cementitious compositions.

It has been discovered that an average microsphere size of a diameter of less than 10 μm leads to favorable results such as reduced degradation of polymeric microspheres during mixing. This is especially important in a dry cast cementitious mixture where the forces produced during molding and compaction of the final product can degrade or damage significant amounts of polymeric microspheres.

The polymeric microspheres can be incorporated in the dry cast cementitious mixture in various manners. They may be added as dry powder, in the form of a non-dusting composition, in combination with other admixtures, or as a compacted mass such as a "puck" or "tablet" form, or as a liquid admixture such as a paste or slurry. Polymeric microspheres may be mixed with a binder and formed into a shape. Particle size is designed to provide a convenient volume percent of voids (i.e. 0.25 volume % per unit). The dry polymeric microspheres in the dry powder or compacted mass forms may be pre-mixed, if desired, with the dry cement.

The amount of polymeric microspheres to be added to the dry cast cementitious composition is about 0.1 percent by weight of dry cement weight to about 4 percent by weight of dry cement or about 0.05 percent to about 4 percent by volume percentage of dry cast cementitious mixture.

The gas generating additives are any compound that generates nitrogen, oxygen, hydrogen, carbon dioxide, carbon monoxide, ammonia, or methane gas. The gas-generating additives have a large range of chemistries, for example nitrogen gas generating compounds such as hydrazine, hydrazide, azide, azo compound, azodicarbonamides, toluene sulfonylhydrazide, benzenesulfonyl hydrazide, toluenesulfonyl acetone hydrazone, toluene sulfonylsemicarbazide, phenyltetrazole, dinitroso-pentamethylenetetramine; hydrogen gas generating compounds such as sodium borohydride; oxygen gas generating compounds such as organic peroxide, inorganic peroxide; carbon dioxide generating compounds such as sodium bicarbonate or other alkali metal or alkaline earth carbonates; and air generating compounds such as activated carbon.

The gas generating additives may comprise various hydrazide chemistries. In general hydrazides have the advantage of generating gas after the cementitious composition is in place and are insoluble in water, therefore it is not significantly affected by the mechanical action of mixing. In the prior art, hydrazides have been used to provide some expansive offset to the chemical shrinkage in mortars and grouts demonstrating that it does not react significantly in the early stages of mixing cement and water. Hydrazides such as 4,4'-oxydibenzenesulfonyl hydrazide can be used.

Gas generating additives may be added to dry cast cementitious compositions (in an amount of about 0.01 to about 0.5 weight percent (wt. %) of dry cementitious material) in a number of manners, for example as a powder, slurry or paste. It has been observed that in certain embodiments, use of a liquid admixture such as a paste or slurry reduces dusting and loss of dry powdered material during charging of the mixer. Another option for adding the gas generating additive to the dry cast cementitious mixture is through the formation of a compact mass, i.e., block or puck, similar to the DELVO® ESC retarding admixture (sold by Degussa Admixtures, Inc., Cleveland, Ohio).

The dry cast cementitious composition described herein may contain other additives or ingredients and should not be limited to the stated formulations. Cement additives that can be added include, but are not limited to: air entrainers, aggregates, pozzolans, dispersants, set and strength accelerators/enhancers, set retarders, water reducers, wetting agents, water soluble polymers, rheology modifying agents, water repellents, dampproofing admixtures, permeability reducers, pumping aids, fungicidal admixtures, germicidal admixtures, insecticide admixtures, finely divided mineral admixtures, alkali-reactivity reducer, bonding admixtures, shrinkage reducing admixtures, and any other admixture or additive that does not adversely affect the properties of the dry cast cementitious composition.

Aggregate can be included in the cementitious formulation to prepare mortars, which include fine aggregate, and concretes which also include coarse aggregate. The fine aggregates are materials that almost entirely pass through a Number 4 sieve (ASTM C 125 and ASTM C 33), such as silica sand. The coarse aggregates are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, silica fume, slag, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

Silica fume, or other pozzolans such as fly ash, slag or calcined clay such as metakaolin, can be added to the cementitious dry cast mixture in an amount from about 5% to about 70% based on the weight of cement.

Another embodiment provides for a method of making a freeze-thaw damage resistant dry cast cementitious article. The method comprises providing a mixture of hydraulic cement, water, polymeric microspheres, coarse aggregate, fine aggregate, and optionally gas-generating additives dispersant, silica fume, pozzolans such as fly ash, slag or calcined clay, and pigments, and then forming the article from the mixture. Forming can be accomplished by any method including placing the mixture in a mold and vibrating the mold, or extruding the mixture through a die.

A dispersant if used in the dry cast cementitious composition can be any suitable dispersant such as calcium lignosulfonates, sulfonated melamine formaldehyde condensates, polycarboxylates, naphthalene sulfate formaldehyde condensate resins for example LOMAR D® (Cognis Inc., Cincinnati, Ohio), or oligomeric dispersants.

Polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cementitious compositions. Examples of polycarboxylate dispersants can be found in U.S. Pub. No. 2002/0019459 A1, U.S. Pat. Nos. 6,267,814, 6,290,770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, and 5,912,284, 5,840,114, 5,753,744, 5,728,207, 5,725,657, 5,703,174, 5,665,158, 5,643,978, 5,633,298, 5,583,183, and 5,393,343, which are all incorporated herein by reference.

The polycarboxylate dispersants used in the system can be at least one of the dispersant formulas a) through j):
a) a dispersant of Formula (I):

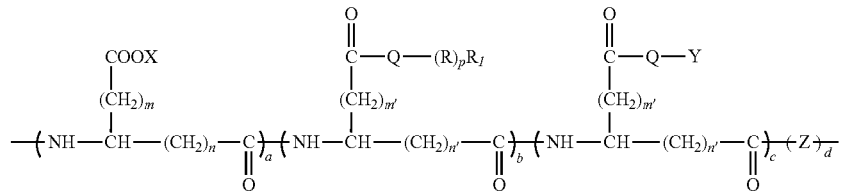

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;
b) a dispersant of Formula (II):

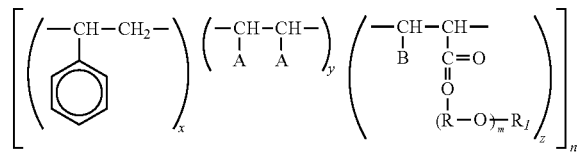

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;
c) a dispersant comprising at least one polymer or a salt thereof having the form of a copolymer of
i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
ii) a monomer having the formula $CH_2=CHCH_2—(OA)_n$ OR, wherein n is an integer from 1-90 and R is a $C_{1-20}$ alkyl group;
d) a dispersant obtained by copolymerizing 5 to 98% by weight of an (alkoxy)polyalkylene glycol mono(meth)acrylic ester monomer (a) represented by the following general formula (1):

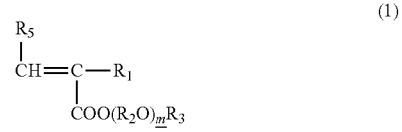

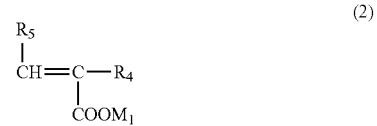

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;
e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;
f) a dispersant of Formula (III):

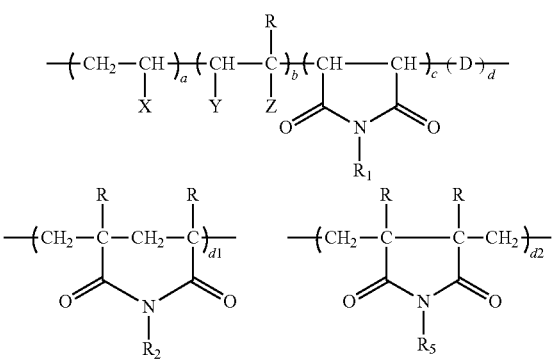

wherein in Formula (III):
D=a component selected from the group consisting of the structure d1, the structure d2, and mixtures thereof;
X=H, $CH_3$, $C_2$ to $C_6$ Alkyl, Phenyl, p-Methyl Phenyl, or Sulfonated Phenyl;
Y=H or —COOM;
R=H or $CH_3$;
Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2$ $CH_2SO_3M$, —$COO(CHR_4)_nOH$ where n=2 to 6, or —$O(CH_2)_nOR_4$ wherein n=2 to 6;
$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;
b=about 0.2 to about 1.0;
c=0 to about 0.5;
d=0 to about 0.5;

wherein a, b, c, and d represent the mole fraction of each unit and the sum of a, b, c, and d is 1.0;

wherein a can represent 2 or more differing components in the same dispersant structure;

wherein b can represent 2 or more differing components in the same dispersant structure;

wherein c can represent 2 or more differing components in the same dispersant structure; and wherein d can represent 2 or more differing components in the same dispersant structure;

g) a dispersant of Formula (IV):

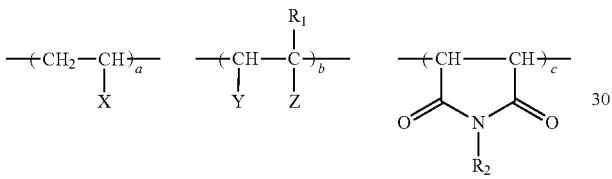

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula $R_5O—(CH_2CH_2O)_s—(CH_2C(CH_3)HO)_t—(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —O(CH$_2$)$_n$OR$_3$ where n=2 to 6, —COOR$_3$, —(CH$_2$)$_n$OR$_3$ where n=0 to 6, or —CONHR$_3$;

$R_1$=H, or $CH_3$;

$R_2$, $R_3$, are each independently a random copolymer of oxyethylene units and oxypropylene units of the general formula —(CH(R$_1$)CH$_2$O)$_m$R$_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01-0.8;
b=0.2-0.99;
c=0-0.5;

wherein a, b, c represent the mole fraction of each unit and the sum of a, b, and c, is 1;

wherein a can represent 2 or more differing components in the same dispersant structure; and wherein c can represent 2 or more differing components in the same dispersant structure;

h) a random copolymer corresponding to the following Formula (V) in free acid or salt form having the following monomer units and numbers of monomer units:

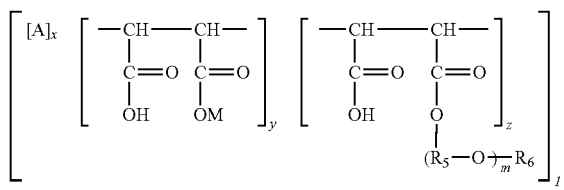

wherein A is selected from the moieties (i) or (ii)

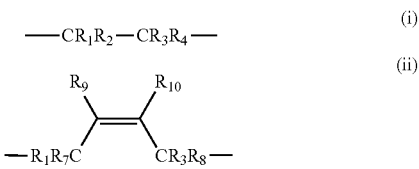

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —(R$_5$O)$_m$R$_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;
y is 0 to 100;
m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated mono and/or dicarboxylic acids, comprising:

i) 0 to 90 mol % of at least one component of the formula 3a or 3b:

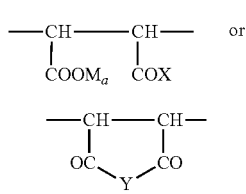

(3a)

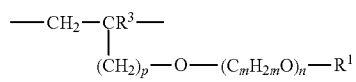

(3b)

wherein M is a hydrogen atom, a mono- or divalent metal cation, an ammonium ion or an organic amine residue, a is 1, or when M is a divalent metal cation a is ½;

wherein X is —$OM_a$,
—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
—$NHR_2$, —$N(R^2)_2$ or mixtures thereof in which $R^2$=$R^1$ or —CO—$NH_2$; and wherein Y is an oxygen atom or —$NR^2$;

ii) 1 to 89 mol % of components of the general formula 4:

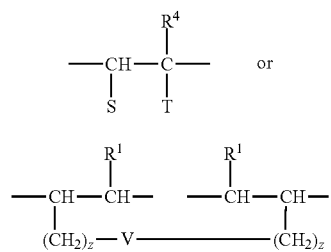

(4)

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is independently 2 to 4, and n is 0 to 100, and iii) 0 to 10 mol % of at least one component of the formula 5a or 5b:

(5a)

(5b)

wherein S is a hydrogen atom or —$COOM_a$ or —$COOR_5$, T is —$COOR_5$, -W-$R_7$, —CO—[—NH—(CH2)3)-]$_s$-W-$R_7$, —CO—O—$(CH_2)_z$-W-$R_7$, a radical of the general formula:

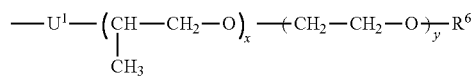

or —$(CH_2)_z$—V—$(CH_2)_z$—CH=CH—$R_1$, or when S is —$COOR_5$ or —$COOM_a$, $U_1$ is —CO—NHM-, —O— or —$CH_2O$, $U_2$ is —NH—CO—, —O— or —$OCH_2$, V is —O—CO—$C_6H_4$—CO—O— or -W-, and W is

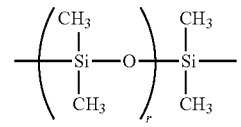

$R_4$ is a hydrogen atom or a methyl radical, $R_5$ is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6$=$R_1$ or

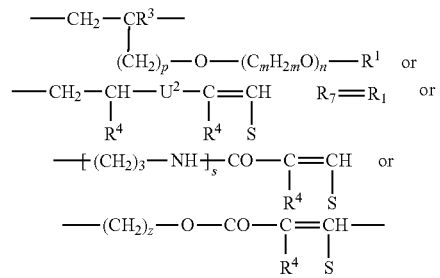

r is 2 to 100, s is 1 or 2, x is 1 to 150, y is 0 to 15 and z is 0 to 4;

iv) 0 to 90 mol % of at least one component of the formula 6a, 6b, or 6c:

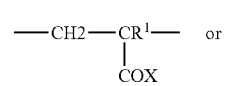
(6a)

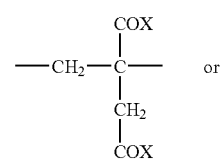
(6b)

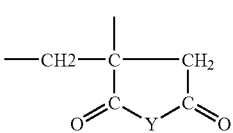
(6c)

wherein M is a hydrogen atom, a mono- or divalent metal cation, an ammonium ion or an organic amine residue, a is 1, or when M is a divalent metal cation a is ½;

wherein X is —$OM_a$,
—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
—NH—$(C_mH_{2m}O)_n$—$R^1$,
—$NHR_2$, —$N(R^2)_2$ or mixtures thereof in which $R^2$=$R^1$ or —CO—$NH_2$; and wherein Y is an oxygen atom or —$NR^2$;

j) a copolymer of dicarboxylic acid derivatives and oxyalkylene glycol-alkenyl ethers, comprising:
  i) 1 to 90 mol. % of at least one member selected from the group consisting of structural units of formula 7a and formula 7b:

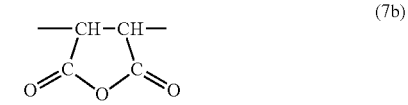

wherein M is H, a monovalent metal cation, a divalent metal cation, an ammonium ion or an organic amine;
a is ½ when M is a divalent metal cation or 1 when M is a monovalent metal cation;
wherein $R^1$ is —$OM_a$, or
—O—$(C_mH_{2m}O)_n$—$R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;
m is 2 to 4;
n is 1 to 200;
  ii) 0.5 to 80 mol. % of the structural units of formula 8:

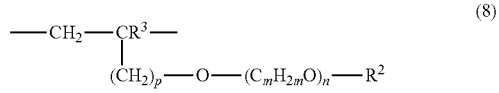

wherein $R^3$ is H or a $C_{1-5}$ aliphatic hydrocarbon;
p is 0 to 3;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;
m is 2 to 4;
n is 1 to 200;
  iii) 0.5 to 80 mol. % structural units selected from the group consisting of formula 9a and formula 9b:

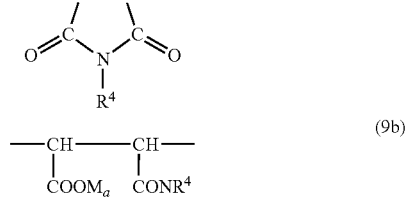

wherein $R^4$ is H, $C_{1-20}$ aliphatic hydrocarbon that is optionally substituted with at least one hydroxyl group, —$(C_mH_{2m}O)_n$—$R^2$, —CO—NH—$R^2$, $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

M is H, a monovalent metal cation, a divalent metal cation, an ammonium ion or an organic amine;
a is ½ when M is a divalent metal cation or 1 when M is a monovalent metal cation;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;
m is 2 to 4;
n is 1 to 200;
  iv) 1 to 90 mol. % of structural units of formula 10

wherein $R^5$ is methyl, or methylene group, wherein $R^5$ forms one or more 5 to 8 membered rings with $R^7$;
$R^6$ is H, methyl, or ethyl;
$R^7$ is H, a $C_{1-20}$ aliphatic hydrocarbon, a $C_{6-14}$ aryl that is optionally substituted with at least one member selected from the group consisting of —$COOM_a$, —$(SO_3)M_a$, and —$(PO_3)M_{a2}$, a $C_{5-8}$ cycloaliphatic hydrocarbon, —$OCOR^4$, —$OR^4$, and —$COOR^4$, wherein $R^4$ is H, a $C_{1-20}$ aliphatic hydrocarbon that is optionally substituted with at least one —OH, —$(C_mH_{2m}O)_n$—$R^2$, —CO—NH—$R^2$, $C_{5-8}$ cycloaliphatic hydrocarbon, or a $C_{6-14}$ aryl residue that is optionally substituted with a member selected from the group consisting of —$COOM_a$, —$(SO_3)M_a$, and —$(PO_3)M_{a2}$;

In formula (e) the word "derived" does not refer to derivatives in general, but rather to any polycarboxylic acid/salt side chain derivatives of oligoalkyleneglycols, polyalcohols and polyalkylene glycols that are compatible with dispersant properties and do not destroy the graft polymer.

The substituents in the optionally substituted aryl radical of formula (i), containing 6 to 14 carbon atoms, may be hydroxyl, carboxyl, $C_{1-14}$ alkyl, or sulfonate groups.

The substituents in the substituted benzene may be hydroxyl, carboxyl, $C_{1-14}$ alkyl, or sulfonate groups.

The term oligomeric dispersant refers to oligomers that are a reaction product of:
  (k) component A, optionally component B, and component C; wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof; wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly (oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, or mixtures thereof, that are disclosed in U.S. Pat. Nos. 6,133, 347, 6,492,461, and U.S. Pat. No. 6,451,881, which are hereby incorporated by reference.

Set and strength accelerators/enhancers that can be used include, but are not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (preferably bromide). Examples of accelerators that can be used include, but are not limited to, POZZOLITH® NC534, non chloride type accelerator and/or RHEOCRETE® CNI calcium nitrite-based corrosion inhibitor both sold under the trademarks by Degussa Admixtures Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodamide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_d CHRCH_2R]_e$, where R is independently H or OH, c is 3-e, d is 0 to about 4 and e is 1 to about 3. Examples include, but are not limited to, are monoethanoalamine, diethanolamine, triethanolamine, and triisopropanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. An example of carboxylic acid salt is calcium formate.

A polyhydroxylalkylamine can have the general formula

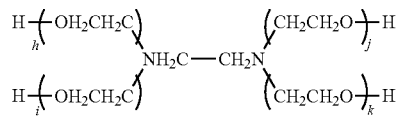

wherein h is 1 to 3, i is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of dry cast cementitious compositions. They can be added to the dry cast cementitious composition upon initial batching or sometime after the hydration process has begun. Set retarders are used to offset the accelerating effect of hot weather on the setting of dry cast cementitious compositions, or delay the initial set of concrete or grout when difficult conditions of placement occur, or problems of delivery to the job site, or to allow time for special finishing processes. Most set retarders also act as low level water reducers and can also be used to entrain some air into dry cast cementitious compositions. Lignosulfonates, hydroxylated carboxylic acids, borax, gluconic, tartaric and other organic acids and their corresponding salts, phosphonates, certain carbohydrates such as sugars and sugar-acids and mixtures thereof can be used as retarding admixtures.

Dampproofing admixtures reduce the permeability of concrete that has low cement contents, high water-cement ratios, or a deficiency of fines in the aggregate portion. These admixtures retard moisture penetration into dry concrete and include certain soaps, stearates, and petroleum products.

Permeability reducers are used to reduce the rate at which water under pressure is transmitted through concrete. Silica fume, fly ash, ground slag, metakaolin, natural pozzolans, water reducers, and latex can be employed to decrease the permeability of the concrete.

Pumping aids are added to dry cast cementitious compositions to improve pumpability. These admixtures thicken the fluid dry cast cementitious compositions, i.e., increase its viscosity, to reduce de-watering of the paste while it is under pressure from the pump. Among the materials used as pumping aids in dry cast cementitious compositions are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Coloring admixtures are usually composed of pigments, either organic such as phthalocyanine or inorganic pigments such as metal-containing pigments that comprise, but are not limited to metal oxides and others, and can include, but are not limited to, iron oxide containing pigments such as CHROMIX® L (Degussa Admixtures, Cleveland Ohio), chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

Alkali-reactivity reducers can reduce the alkali-aggregate reaction and limit the disruptive expansion forces that this reaction can produce in hardened concrete. Pozzolans (fly ash, silica fume), blast-furnace slag, salts of lithium and barium are especially effective.

The shrinkage reducing agent which can be used comprises but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® admixture is an example of a shrinkage reducing agent (available from Degussa Admixtures Inc. of Cleveland, Ohio) that can be used.

Cementitious dry cast mixtures have been found to respond to vibration or applied energy when the mixture is properly proportioned. When the mold is subjected to vibration or other energy, the paste fraction of the mixture functions as the vehicle/lubricant by which the solid aggregate particles move and orient themselves during consolidation.

The reduced paste content provides cementitious dry cast mixtures with stiff to extremely dry consistencies, with typical water/cement (w/c) ratios of about 0.2 to about 0.8. Low paste to aggregate ratios (on a volume basis) produce mixtures, which do not flow under gravity and require additional vibration and pressure to compact the mixture into a final form. The non-flowing consistency and mechanically enhanced compaction allow the final product item to be immediately removed from a mold or extruded from a die with the correct final shape and dimensions.

Green strength refers to the stability of the article in retaining its shape once the article is removed from the mold or extruder. Green strength is dependent on the consistency of the cementitious dry cast mixture, paste content and the particle size distribution of the aggregate materials.

Examples of some of the embodiments described herein were tested for their effect on Freeze-Thaw (F/T) durability. F/T durability for dry cast products is usually specified by results from ASTM C 1262-98 "Standard Test Method for Evaluating the Freeze-Thaw Durability of Manufactured Concrete Masonry Units and Related Concrete Units.

This test method provides for the preparation and testing of specimens from Concrete Manufactured Units (CMU) to determine resistance to repeated cycles of freezing and thawing. Test specimens are placed in contact with a liquid (either tap water or tap water containing 3% by weight sodium chloride) in a sealed container. This container is placed in a test chamber which repeatedly and reproducibly cycles the temperature of the test specimen above and below the freezing point of water. One sequence of freezing and thawing is referred to as a cycle. After a certain numbers of cycles the test specimen is weighed to determine how much material has been removed from the test specimen. This weight loss occurs as small particles of the concrete composite separate from the original test piece. In general a test specimen is determined as failed when it loses 1% or more of its starting mass. The number of cycles required to produce at least this 1% weight loss is reported as number of cycles to failure.

Table 1 shows data from a study designed to determine the effect of test specimen density on F/T durability. Test specimens were prepared at three levels of density from two dry cast mixtures.

Both test mixes used the same cement and aggregate raw materials.

The plain mixtures had the following components:

| cement | 16% of total dry weight |
| aggregate | 84% of total dry weight |
| w/c ratio | 0.50 (approximately 8% of fresh mix is available water) |

The mixture containing admixtures had the following components:

| cement | 15% of total dry weight |
| aggregate | 85% of total dry weight |
| w/c ratio | 0.47 (approximately 7% of fresh mix is available water) | color enhancement admixture (Color Cure XD available from Degussa Admixtures, Inc.) contains both calcium stearate and a latex polymer as active ingredients –0.6% active material (approximately 0.24% latex polymer and 0.32% calcium stearate) by weight of dry cement (approx. 22 oz/cwt of cementitious material).
dispersant (Rheomix 730S available from Degussa Admixtures, Inc.) –0.05% active material by weight of dry cement (approx 8.5 oz/cwt of cementitious material)

The following table and two graphs (FIG. 1 and FIG. 2) show test specimen data and the ASTM C 1262 results.

TABLE 1

| Sample | | density (lb/ft$^3$) | Water cycle at fail | Saline cycle at fail | mean % wt loss |
|---|---|---|---|---|---|
| 1 | HD plain | 131.6 | >100 | 100 | 1.1 |
| 2 | HD admix | 132.1 | >100 | 50 | 1 |
| 3 | MD plain | 122.5 | >100 | 25 | 2.7 |
| 4 | MD admix | 124.4 | 75 | 12 | 2.2 |
| 5 | LD plain | 116.9 | 100 | 12 | 13 |
| 6 | LD admix | 116.6 | 25 | 12 | 29 |

Figure 2:
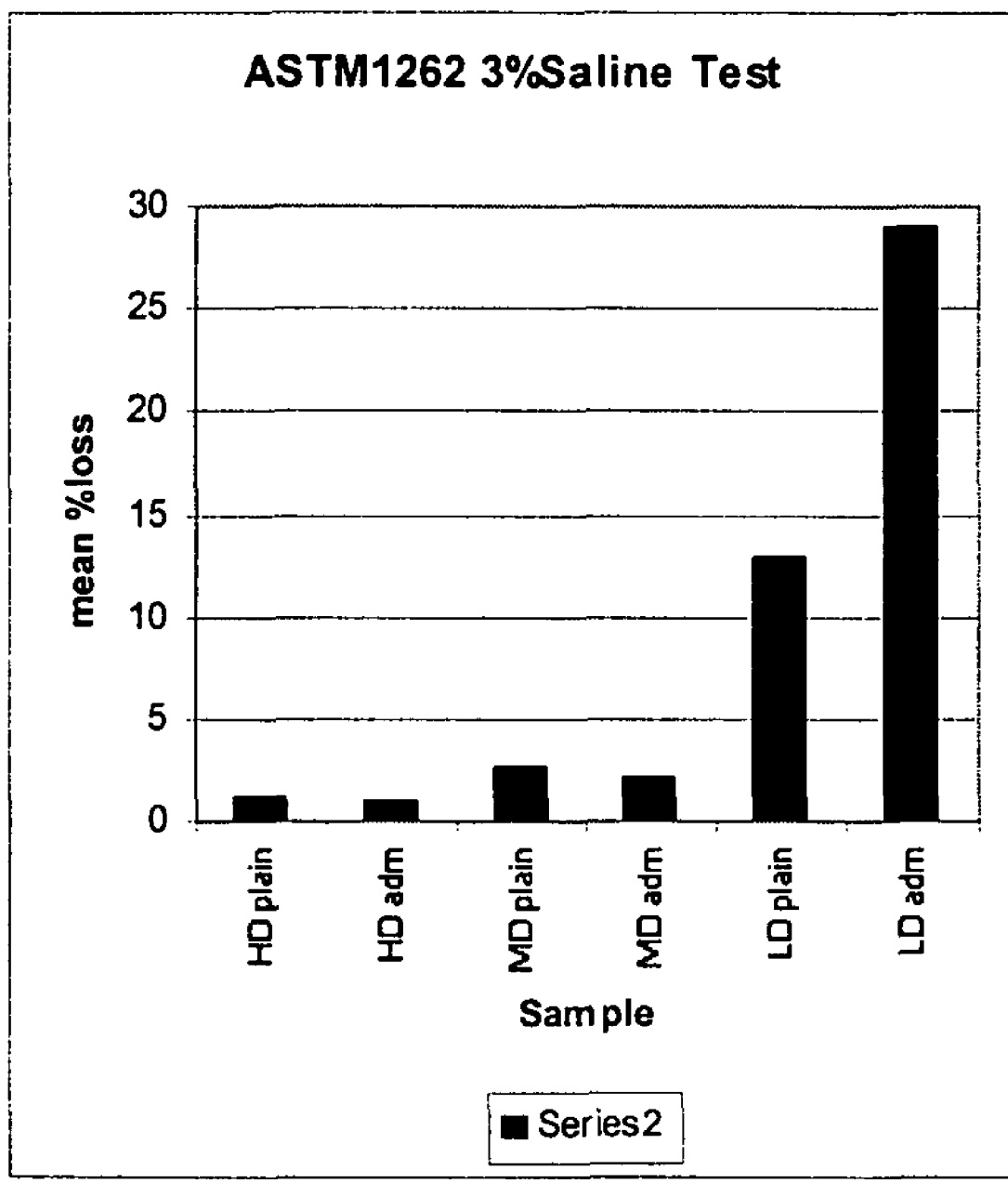
FIG. 2 is a graph representing the percent of total weight loss at failure for the different density dry cast cementitious mixtures, i.e. those with an admixture and those without.

HD = high density
MD = medium density
LD = low density
mean % wt loss—mean percent weight loss at fail The data in Table 1 shows a reduction in F/T durability as the density of the test specimen is reduced (FIG. 1). For the samples with high and medium density (samples 1 to 4) this is shown by the reduction in cycles at fail. For the low density specimens (samples 5 and 6) a sharp increase in the mean percent weight loss for the low density test specimens was observed (FIG. 2). The data also shows that in each sample containing the admixture (samples 2, 4, 6) there was a reduction in freeze thaw durability relative to the test specimens containing no admixture (samples 1,3,5). This result may be due in part to the slightly lower cement content of the admixture test specimens.

Table 2 shows ASTM 1262 test data using polymeric microspheres in dry cast cementitious mixtures. The mixtures in these tests comprise:

| cement | 13% or 16% of total dry weight |
| aggregate | 84% or 87% of total dry weight |
| w/c ratio | 0.50 (approximately 8% of fresh mix is available water) |

Expancel polymeric microspheres (Stockviksverken, Sweden), product 551 DE 40 (Dry Expanded Polymeric microspheres of about 30 μm to about 50 μm average diameter), were used in all tests and dosed at the volume % contents shown in Table 2.

TABLE 2

| Sample | cement % of mix | micros Vol % | density (lb/ft$^3$) | Water % Abs | 7 D CStr psi | Saline cycle@fail | mean % wt loss |
|---|---|---|---|---|---|---|---|
| 7  | 16 | 2.7 | 125 |     |      | 100 | 1.0 |
| 8  | 16 | 2.7 | 133 | 7.8 | 5950 | 100 | 1.8 |
| 9  | 16 | 1.4 | 131 | 8.1 | 6550 | 50  | 1.0 |
| 10 | 16 | 0   | 134 | 7.8 | 6000 | 25  | 2.5 |
| 11 | 13 | 2.2 | 131 | 7.7 | 6150 | 100 | 0.9 |
| 12 | 13 | 1.1 | 130 | 8   | 5150 | 50  | 4.0 |
| 13 | 13 | 0   | 133 | 7.5 | 6250 | 25  | 0.9 |

7D CStr psi—7 day compressive strength in pounds per square inch
micros—polymeric microspheres
mean % wt loss—mean percent weight loss at fail Table 2 does not show a significant difference in F/T durability between the 13% (samples 11-13) and 16% (samples 7-10) cement component mixtures. The data in the table does show that the presence of polymeric microspheres in a plain dry cast mixture increases the number of F/T cycles required to create a 1% weight loss. Mixtures of both cement contents (13% and 16%) containing about 1 volume percent polymeric microspheres (samples 9 and 12) tested in a saline solution doubled the number of F/T cycles before failure and samples with about two volume percent (samples 7, 8 and 11) quadrupled the number of F/T cycles at failure relative to the untreated reference specimens (samples 10 and 13). This is a significant improvement in F/T durability.

Table 3 shows ASTM 1262 test data using polymeric microspheres in dry cast cementitious mixtures. The mixtures in these tests comprise:

| cement (lbs) | 875 |
|---|---|
| aggregate (lbs) | 7,164 |
| water | 6% based on the total weight of the cement and aggregate in the samples |

Expancel polymeric microspheres (Stockviksverken, Sweden), product 551 WE 40 (Wet Expanded polymeric microspheres of about 30 μm to about 50 μm average diameter), were used in sample 15 and dosed at the volume % content shown in Table 3.

TABLE 3

| Sample | cement % of mix | micros Vol % | density (lb/ft$^3$) | Water % Abs | 7 D CStr psi | Saline cycle@fail | mean % wt loss |
|---|---|---|---|---|---|---|---|
| 14 | 11 | 0 | 143 | 5.4 | 5510 | 12 | 90.7 |
| 15 | 11 | 2 | 143 | 4.2 | 6110 | 50 | 2.9 |

7D CStr psi—7 day compressive strength in pounds per square inch
micros—polymeric microspheres
mean % wt loss—mean percent weight loss at fail The data in Table 3 shows an increase in F/T durability in the sample that contained the polymeric microspheres (15) relative to that of the sample without polymeric microspheres (14). This is demonstrated in the greater amount of cycles in which failure occurred in sample 15 (50 cycles) to that of sample 14 (12 cycles) and the high weight loss of sample 14 at failure −90.7% as compared to sample 15 −2.9%.

Table 4 shows ASTM 1262 test data using polymeric microspheres in dry cast cementitious mixtures. The mixtures in these tests cement comprise:

| cement (lbs) | 950 |
|---|---|
| aggregate (lbs) | 6,210 |
| water | 6% based on the total weight of the cement and aggregate in the samples |

Expancel polymeric microspheres (Stockviksverken, Sweden), product 551 WE 40 (Wet Expanded polymeric microspheres of about 30 μm to about 50 μm average diameter) and Expancel polymeric microspheres (Stockviksverken, Sweden), product 551 WE 20 (Wet Expanded polymeric microspheres of about 10 μm to about 30 μm average diameter), were used in the samples and dosed at the volume % contents shown in Table 4. All samples (16-20) contained 4.5 oz/cwt Rheomix® 730S plasticizer (Degussa Admixtures, Inc. Cleveland, Ohio). Sample 16 contained no polymeric microspheres but did contain 3.5 oz/cwt of a conventional concrete air-entraining admixture; Microair® (Degussa Admixtures, Inc. Cleveland, Ohio). Sample 17 contained WE 20 polymeric microspheres. Sample 18 contained WE 20 polymeric microspheres and 6 oz/cwt of PT1447 a water repellent admixture. Sample 19 contained WE 40 polymeric microspheres and 6 oz/cwt of PT1447 a water repellent admixture. Sample 20 contained WE 40 polymeric microspheres.

TABLE 4

| Sample | cement % of mix | micros Vol % | density (lb/ft$^3$) | Water % Abs | 7 D CStr psi | Saline cycle@fail | mean % wt loss |
|---|---|---|---|---|---|---|---|
| 16 | 16 | 0 | 143 | 4.1 | 7429 | 50 | 1.8 |
| 17 | 16 | 1.1 WE 20 | 142 | 3.8 | 7141 | 150+ | 0.5 |
| 18 | 16 | 1.1 WE 20 | 144 | 3.1 | 8656 | 125 | 1.1 |

TABLE 4-continued

| Sample | cement % of mix | micros Vol % | density (lb/ft³) | Water % Abs | 7 D CStr psi | Saline cycle@fail | mean % wt loss |
|---|---|---|---|---|---|---|---|
| 19 | 16 | 1.4 WE 40 | 141 | 3.4 | 8167 | 125 | 1.3 |
| 20 | 16 | 1.4 WE 40 | 142 | 3.7 | 7554 | 150+ | 0.3 |

7D CStr psi—7 day compressive strength in pounds per square inch
micros—polymeric microspheres
mean % wt loss—mean percent weight loss at fail
150+—samples were still below 1% weight loss at last cycle measured (150)

The data in Table 4 shows an increase in F/T durability in the samples that contained the polymeric microspheres (17-20) relative to that of the sample without polymeric microspheres (16). This is demonstrated in the greater amount of cycles in which failure occurred in sample 17 (150+ cycles), sample 18 (125 cycles), sample 19 (125 cycles), sample 20 (150+ cycles) to that of sample 16 (50 cycles).

In one embodiment the cementitious freeze-thaw damage resistant dry cast composition comprises hydraulic cement, polymeric microspheres and optionally gas generating additives, wherein the gas-generating additive may be a hydrazide, most preferably wherein the hydrazide may be 4,4'-oxydibenzenesulfonyl hydrazide. The polymeric microspheres may be gas filled or liquid filled. Further the polymeric microspheres may comprise at least one of polyethylene, polypropylene, polymethyl methacrylate, poly-o-chlorostyrene, polyvinyl chloride, polyvinylidene chloride, polyacrylonitrile, polymethacrylonitrile, polystyrene, or copolymers or mixtures thereof, or copolymers of vinylidene chloride-acrylonitrile, polyvinylidene chloride-copolyacrylonitrile, polyacrylonitrile-copolymethacrylonitrile, vinyl chloride-vinylidene chloride.

In another embodiment the cementitious dry cast composition comprises at least one of the following characteristics: the water to cement ratio is from about 0.2 to about 0.8; the gas generating additive is present in a range from about 0.05 to 2 weight percent by weight cementitious material; the polymeric microspheres are present in a range from about 0.01 percent to about 4 percent by dry weight of cement; the polymeric microspheres have an average diameter of about 0.1 µm to about 100 µm; or the polymeric microspheres have an average diameter of less than about 10 µm.

In another embodiment the cementitious dry cast compositions described above further comprise at least one of air entrainers, aggregates, pozzolans, dispersants, set and strength accelerators/enhancers, set retarders, water reducers, wetting agents, water soluble polymers, rheology modifying agents, water repellents, dampproofing admixtures, permeability reducers, pumping aids, fungicidal admixtures, germicidal admixtures, insecticide admixtures, finely divided mineral admixtures, alkali-reactivity reducer, bonding admixtures, shrinkage reducing admixtures or mixtures thereof.

In other embodiments a dry cast cementitious article is produced from the compositions described above.

In another embodiment a method for preparing a freeze-thaw damage resistant dry cast cementitious article from the compositions described above is provided that comprises mixing hydraulic cement, polymeric microspheres and optionally gas-generating additives to produce a cementitious composition mixture; and forming the mixture into an article. In certain embodiments the polymeric microspheres or gas-generating additives are added as at least one of a compact mass, powder, or liquid admixture such as a slurry or paste.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A cementitious freeze-thaw damage resistant dry cast composition comprising hydraulic cement, polymeric microspheres, and optionally gas generating additives.

2. The cementitious dry cast composition of claim 1 wherein the water to cement ratio is from about 0.2 to about 0.8.

3. The cementitious dry cast composition of claim 1 wherein the polymeric microspheres comprise a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, or copolymers or mixtures thereof.

4. The cementitious dry cast composition of claim 1 wherein the polymeric microspheres comprise at least one copolymer of vinylidene chloride-acrylonitrile, polyvinylidene chloride-copolyacrylonitrile, vinyl chloride-vinylidene chloride or mixtures thereof.

5. The cementitious dry cast composition of claim 1 wherein the polymeric microspheres are present in a range from about 1% to about 4% by weight of dry cement.

6. The cementitious dry cast composition of claim 1 wherein the polymeric microspheres are present in a range from about 0.05% to about 4% by volume percent of the cementitious mixture.

7. The cementitious dry cast composition of claim 1 wherein the polymeric microspheres are at least one of gas filled or liquid filled.

8. The cementitious dry cast composition of claim 1 wherein the polymeric microspheres have an average diameter of about 0.1 µm about 100 µm.

9. The cementitious dry cast composition of claim 1 wherein the polymeric microspheres have an average diameter of about 10 µm or less.

10. The cementitious dry cast composition of claim 1 wherein the cementitious composition contains gas generating additives.

11. The cementitious dry cast composition of claim 1 wherein the gas generating additive is at least one of hydrazide, hydrazine, azide, or azo compound.

12. The cementitious dry cast composition of claim 1 wherein the gas generating additive is at least one of azodicarbonamide, sodium bicarbonate, organic peroxide, inorganic peroxide, toluenesulfonylhydrazide, benzenesulfonyl hydrazide, toluenesulfonyl acetone hydrazone, toluenesulfonylsemicarbazide, phenyltetrazole, sodium borohydride, activated carbon or dinitroso-pentamethylenetetramine.

13. The cementitious dry cast composition of claim 1 wherein the gas generating additive is present in a range from about 0.05 to 2 weight percent by dry weight of cement.

14. The cementitious dry cast composition of claim 1 further comprising at least one of air entrainers, aggregates, pozzolans, dispersants, set and strength accelerators/enhancers, set retarders, water reducers, wetting agents, water soluble polymers, rheology modifying agents, water repellents, dampproofing admixtures, permeability reducers, pumping aids, fungicidal admixtures, germicidal admixtures, insecticide admixtures, finely divided mineral admixtures, alkali-reactivity reducer, bonding admixtures, shrinkage reducing admixtures or mixtures thereof.

15. The cementitious dry cast composition of claim 14 wherein the dispersant is at least one of calcium lignosulfonates, sulfonated melamine formaldehyde condensates, polyaspartates, sodium naphthalene sulfate formaldehyde condensate resins, oligomers, or polycarboxylates.

16. A dry cast cementitious article comprising the composition of claim 1.

17. A method for preparing a freeze-thaw damage resistant dry cast cementitious article comprising:
  a. mixing hydraulic cement, polymeric microspheres and optionally a gas generating additive to produce a cementitious composition mixture; and
  b. forming the mixture into an article.

18. The method of claim 17, wherein the polymeric microspheres or gas generating additives are added in at least one of the following forms:
  a. compact mass;
  b. powder; or
  c. liquid admixture.

19. The method of claim 17 wherein the mixture contains a gas generating additive.

20. The method of claim 17 wherein the polymeric microspheres are at least one of gas filled or liquid filled.

* * * * *